Figure 1:
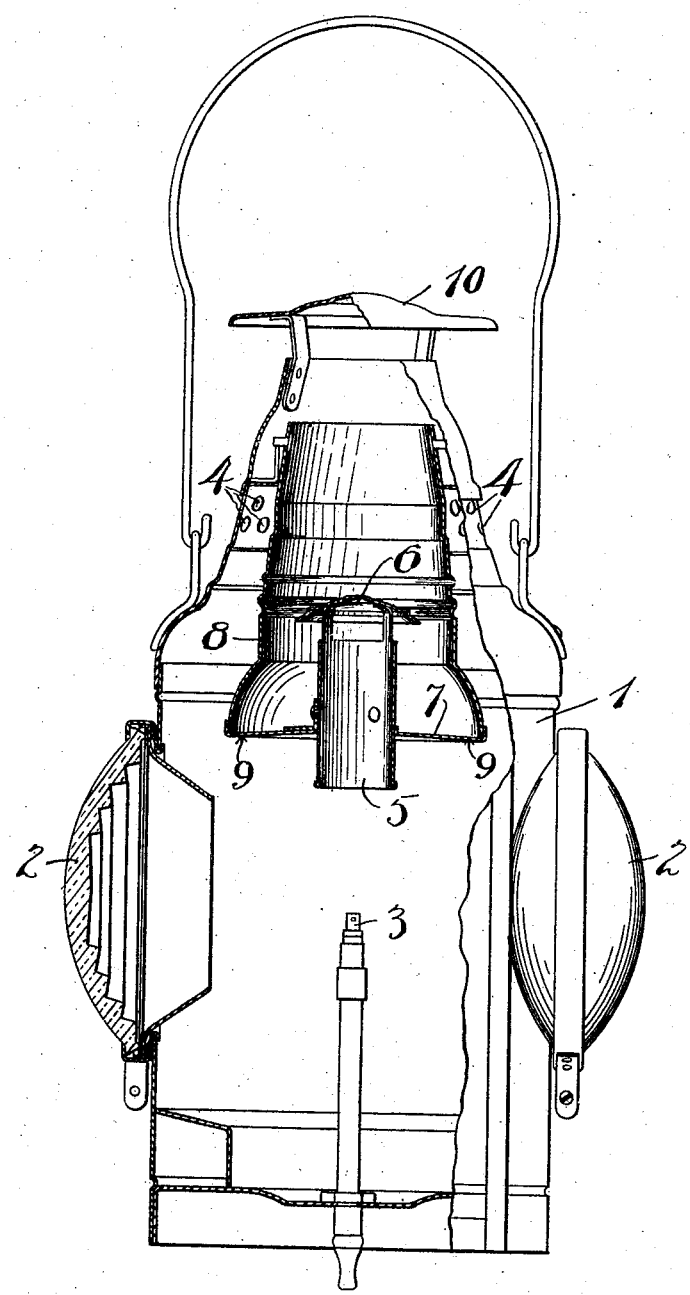

R. E. BRUCKNER.
FLUE CONSTRUCTION FOR SIGNAL LAMPS.
APPLICATION FILED MAY 28, 1910.

986,043.

Patented Mar. 7, 1911.

2 SHEETS—SHEET 1.

Witnesses:

Inventor
R. E. Bruckner
By his Attorneys

R. E. BRUCKNER.
FLUE CONSTRUCTION FOR SIGNAL LAMPS.
APPLICATION FILED MAY 28, 1910.
986,043.
Patented Mar. 7, 1911.
2 SHEETS—SHEET 2.
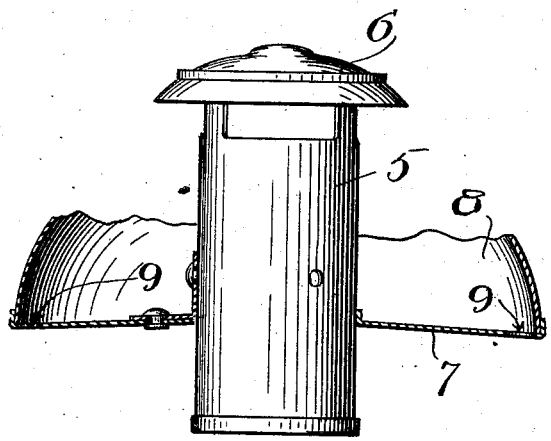
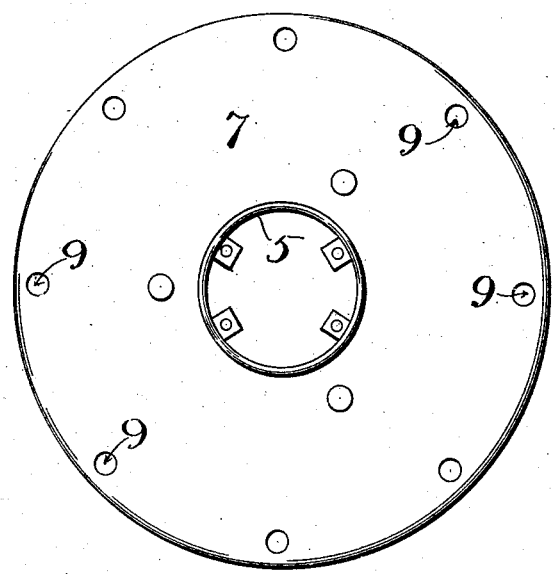

UNITED STATES PATENT OFFICE.

RUDOLPH E. BRUCKNER, OF MOUNT VERNON, NEW YORK, ASSIGNOR TO COMMERCIAL ACETYLENE COMPANY, OF NEW YORK, N. Y., A CORPORATION OF NEW JERSEY.

FLUE CONSTRUCTION FOR SIGNAL-LAMPS.

986,043.     Specification of Letters Patent.     Patented Mar. 7, 1911.

Application filed May 28, 1910. Serial No. 563,890.

*To all whom it may concern:*

Be it known that I, RUDOLPH E. BRUCKNER, a citizen of the United States, residing at Mount Vernon, county of Westchester, State of New York, have invented certain new and useful Improvements in Flue Construction for Signal-Lamps, of which the following is a full, clear, and exact description.

My invention relates to improvements in lanterns.

The object of the invention mainly is to provide improvements in the flue construction, such improvements being readily adapted, at comparatively small cost, to the ordinary lanterns as now constructed.

In the drawings: Figure 1 is in the main a vertical section of a signal lamp adapted to burn acetylene gas and provided with my improved flue. Fig. 2 is a relatively enlarged detail view partly in section. Fig. 3 is a view of the under side of the parts shown in Fig. 2.

1 represents the main body of the lamp, provided with one or more lenses 2—2.

3 is a gas burner.

4—4 are inlet ports in the upper part or dome of the lamp body 1, the same being provided to supply air to support combustion at the burner 3.

5 is a tubular outlet flue having a combined guard and deflector hood 6 so arranged as to prevent rain or snow from falling downwardly through the flue 5, at the same time being so spaced relatively to the upper end of the flue 5 as to permit the products of combustion to readily escape. The flue 5 is supported by an annular drip deflector 7, which in turn is supported by the tubular spacer cone 8 arranged between the inlet ports 4 and the flue 5. The drip deflector 7 is provided with a suitable number of drip ports 9 or clearance spaces near the outer edge thereof so that any water which may enter the tubular spacer wall 8 from above will drip down into the bottom of the lamp body 1 without encountering the tip of the burner 3. The upper end of the spacer wall 8 is obviously open, so as to provide a final outlet for the products of combustion, the extreme upper end of the lamp being provided with a suitable hood 10 properly spaced away from the upper end of the lamp to permit the products of combustion to freely escape, and yet close enough thereto to prevent in a large measure the entrance of rain or snow. The shield members 6—10 coöperate to effectively prevent undue down drafts, which, if not checked, would tend to impair the efficiency of, or extinguish the flame at the burner 3.

By the foregoing construction, it will be seen that the burner is doubly protected from down drafts and from the admission of snow or rain.

In the preferred construction, the drip deflector 7 slants down somewhat from the flue 5 so as to more readily direct water toward the drip ports 9—9. The drip deflector 7 also performs an important function in controlling the drafts of the lamps in that it serves as a baffle plate coöperating with the hoods 6—10 in checking the sudden down drafts which would tend to extinguish the flame, also coöperating therewith in preventing sudden vacuum which frequently results in the extinguishment of the flame.

From the foregoing it will be seen that the improvements are particularly adapted to lamps or lanterns in which a comparatively small flame of high intensity is employed. Where such flames are employed it has heretofore been found to be exceedingly difficult to maintain the flame under severe weather conditions, owing to the fact that such flames, though intense, are more easily extinguished than the less intense flames of larger dimensions such as produced by the ordinary oil burner.

While I have here shown my invention as particularly applied to a lantern of the down draft type, in its broadest sense, it is not necessarily limited thereto.

What I claim is:

1. In a lantern, a main body, a burner therein, a flue arranged above the burner, a drip deflector surrounding and supporting said flue and protecting said burner, a cone surrounding said drip deflector, a hood for said cone, and a hood for said flue within said cone.

2. In a lantern, a main body, a burner therein, a flue arranged above the burner, a drip deflector surrounding and supporting said flue, and protecting said burner, a cone surrounding the drip deflector, a hood for said cone, a hood for the flue within said cone and air inlets in the main body in a plane between the upper and lower ends of said cone.

RUDOLPH E. BRUCKNER.

Witnesses:
R. C. MITCHELL,
CHAS. A. PEARD.

Copies of this patent may be obtained for five cents each, by addressing the "Commissioner of Patents, Washington, D. C."